(12) United States Patent
Bowerman et al.

(10) Patent No.: US 9,088,667 B2
(45) Date of Patent: *Jul. 21, 2015

(54) SYSTEM AND METHOD FOR ASSOCIATING AUDIO CLIPS WITH OBJECTS

(75) Inventors: Jarold Bowerman, Austin, TX (US); David Mancini, Bellevue, WA (US)

(73) Assignee: Texas Technology Ventures 2, LLP, Austin, TX (US)

( * ) Notice: Subject to any disclaimer, the term of this patent is extended or adjusted under 35 U.S.C. 154(b) by 213 days.

This patent is subject to a terminal disclaimer.

(21) Appl. No.: 13/605,900

(22) Filed: Sep. 6, 2012

(65) Prior Publication Data

US 2013/0094636 A1  Apr. 18, 2013

Related U.S. Application Data

(63) Continuation of application No. 11/606,566, filed on Nov. 29, 2006, now Pat. No. 8,280,014.

(60) Provisional application No. 60/816,964, filed on Jun. 27, 2006.

(51) Int. Cl.
*H04M 11/00* (2006.01)
*H04M 3/42* (2006.01)
*H04M 3/533* (2006.01)
*H04W 4/12* (2009.01)

(52) U.S. Cl.
CPC .......... *H04M 11/00* (2013.01); *H04M 3/53383* (2013.01); *H04W 4/12* (2013.01); *H04M 3/42323* (2013.01)

(58) Field of Classification Search
CPC combination set(s) only.
See application file for complete search history.

(56) References Cited

U.S. PATENT DOCUMENTS

| | | | |
|---|---|---|---|
| 5,841,979 A * | 11/1998 | Schulhof et al. | 709/237 |
| 6,591,247 B2 * | 7/2003 | Stern | 705/14.52 |
| 7,032,030 B1 * | 4/2006 | Codignotto | 709/246 |
| 7,069,310 B1 * | 6/2006 | Bartholomew | 709/219 |

* cited by examiner

*Primary Examiner* — Joseph T Phan
(74) *Attorney, Agent, or Firm* — Garlick & Markison; Bruce E. Stuckman

(57) ABSTRACT

A system and method for associating an audio clip with an object is provided wherein the voice-based system, such as a voicemail system, is used to record the audio clips.

20 Claims, 20 Drawing Sheets

VoiceCaptionIt

260

SIGNED IN  CHOCOSAUR  SETTINGS  HELP  SIGN OUT

| MY PHOTOS > | MANAGER > | BROWSE > | MY FRIENDS > | FUN STUFF > |

SEARCH >

LEARN MORE ABOUT VOICECAPTIONIT

WHAT IS VOICECAPTIONIT?

PURPLE WATERLILY BY FATUA NE FACILISI AU MO VEL HOS VIRTUS DOLUS TUM VOCO FORAS DUIS. TINCIDUNT VENTOSUS DIGNISSIM ALIQUIP AUGUE MAURIS TRANSVERBERO SIT POPULUS DIGNISSIM

PURPLE WATERLILY BY FATUA NE FACILISI AU MOLLOR VEL HOS VIRTUS DOLUS TUM VOCO FORAS DUIS. TINCIDUNT VENTOSUS DIGNISSIM ALIQUIP

SIGN UP!

PURPLE WATERLILY BY FATUA NE FACILISI AU MOLLOR VEL HOS VIRTUS DOLUS TUM VOCO FORAS DUIS. TINCIDUNT VENTOSUS DIGNISSIM ALIQUIP AUGUE MAURIS TRANSVERBERO SIT POPULUS DIGNISSIM EUISMOD

PURPLE WATERLILY BY CHOCOSAUR

CLICK TO LISTEN!

OVERALL RATING ★★★★☆

RATE EACH PHOTO!

FUN STUFF | TERMS OF USE | PRIVACY POLICY | COPYRIGHT/INTELLECTUAL PROPERTY POLICY | REPORT ABUSE | PATENT PENDING   COPYRIGHT © 2006 VOICECAPTIONIT, INC

FIGURE 16

VoiceCaptionIt

ALREADY A MEMBER?  SIGN IN   HELP

[BROWSE >]  [FUN STUFF >]

SEARCH >  [        ] 🔍

280 ⤹

\* INDICATES A REQUIRED FIELD

CREATE YOUR VOICECAPTIONIT ACCOUNT

\* FIRST NAME          [          ]
\* LAST NAME           [          ]
\* LOGIN NAME          [          ]
\* PASSWORD            [          ]
\* RE-TYPE PASSWORD    [          ]
\* E-MAIL ADDRESS      [          ]

CREATING YOUR VOICECAPTIONS

VOICECAPTIONIT WORKS BY CALLING THE PHONE NUMBER(S) YOU LIST BELOW TO RECORD YOUR VOICE AND ADD IT AS A VOICECAPTION TO YOUR PHOTO. TO GET STARTED, PLEASE GIVE US A PHONE NUMBER WHERE WE CAN REACH YOU.

VOICECAPTIONIT IS CURRENTLY FOR NORTH AMERICAN RESIDENTS ONLY. PLEASE USE 10 DIGIT PHONE NUMBERS (AREA CODE + 7 DIGITS).

\* PHONE NUMBER   [          ]
  PHONE NUMBER   [          ]
  PHONE NUMBER   [          ]

[SIGN UP]  [CANCEL]

PATENT PENDING      COPYRIGHT © 2006 VOICECAPTIONIT, INC

FUN STUFF | TERMS OF USE | PRIVACY POLICY | COPYRIGHT/INTELLECTUAL PROPERTY POLICY | REPORT ABUSE | PATENT PENDING

SYSTEM AND METHOD FOR ASSOCIATING AUDIO CLIPS WITH OBJECTS

RELATED APPLICATION/PRIORITY CLAIM

This application is a continuation of and claims priority under 35 USC 120 to U.S. patent application Ser. No. 11/606,566, filed Nov. 29, 2006 and entitled "System and Method for Associating Audio Clips With Objects" and further claims priority under 35 USC 119(e) and 120 to U.S. Provisional Patent Application Ser. No. 60/816,964 filed on Jun. 27, 2006 and entitled "System and Method for Associating Audio Clips with Objects", both of which are incorporated herein by reference.

FIELD OF THE INVENTION

The invention relates generally to a system and method for integrating an audio clip with an object.

BACKGROUND OF THE INVENTION

Systems exist that permit a user to associate an audio file with an image. These systems permit the user to speak into a microphone connected to a personal computer in order to record the audio clip which is then associated with an image or a file. The limitation with such systems is that many users of personal computers either do not have a microphone or do not know how to use the microphone. In addition, the audio clip generated using the computer microphone tends to be of poor quality and uncertain volume. Therefore, these systems do not permit a good quality, proper volume audio clip to be recorded so that the audio clip can be associated with the image or piece of content.

Voice mail systems evolved out of very basic, proprietary systems and still demonstrate part of their heritage. Generally, voicemail systems have a simple account management system, where a user typically has an account that is nothing more than an extension or direct in-bound dialing (DID) number. The security of the voicemail system is typically based on a 4 to 6 digit code that the user enters to access their mail box. The "Programming" of the voice mail system is generally a very simple text interface where a system administrator can enter values and record messages. The hierarchy or "tree" of prompts by an automated attendant is often as simple as starting at 1, 2 or 3 and then expanding out to 1.1, 2.1, 3.1 and then on to 1.11, 2.11, 3.11, etc.

Newer systems such as Cisco Unity provide an Application Programming Interface (API) that allows more functionality, such as connecting the voice mail system to a corporate email system. Even these modern "unified" voice mail solutions take a simple approach to storing data (voice mails) and verifying user identity. For example, the Cisco Unity system records all voice mails into a single directory on the hard drive and then forwards the wave file to an email account associated with a DID number. The Unity system relies on Microsoft Exchange (which in turn relies on Windows) for user account authentication, passwords, storage size limits, and access control lists. It would be desirable to be able to use a voicemail system (with its security limitations) to record an audio clip that can then be associated with an object. Thus, it is desirable to provide a system and method for associating audio clips with objects that overcomes the limitations of the typical systems and it is to this end that the present invention is directed.

BRIEF DESCRIPTION OF THE DRAWINGS

FIG. 11 illustrates an example of a browse page of the system when the user is logged into the system;

FIG. 12 illustrates an example of a highest rated page of the system when the user is logged into the system;

FIG. 16 illustrates an example of a learn more page of the system when a user is not logged into the system;

FIG. 18 illustrates an example of a signup page of the system when a user is not logged into the system.

DETAILED DESCRIPTION OF AN EMBODIMENT

The system is particularly applicable to a web-based system for associating an audio clip with a digital photograph on a website using a voicemail system and it is in this context that the system is described. It will be appreciated, however, that the system and method has greater utility since the system may be implemented using other technologies, other communication networks and the like and may be used for a variety of different types of images. For example, the system may be implemented with other voice-based recording systems or it may be implemented using other communication networks other than the web-based example set forth below. In addition, the system may be implemented on a stand-alone computer, a peer to peer network, etc and thus the system is not limited to the client/server architecture using a browser described below. Finally, the system may be used to associate an audio clip with various types of images and is not limited to the exemplary embodiment in which the system is used to associate an audio clip with a digital photograph. Now, two exemplary implementations of the system are described in which the first implementation shown in FIG. 1A is a rudimentary system while the implementation shown in FIG. 1B illustrates a commercial implementation of the system.

Figure 1A:
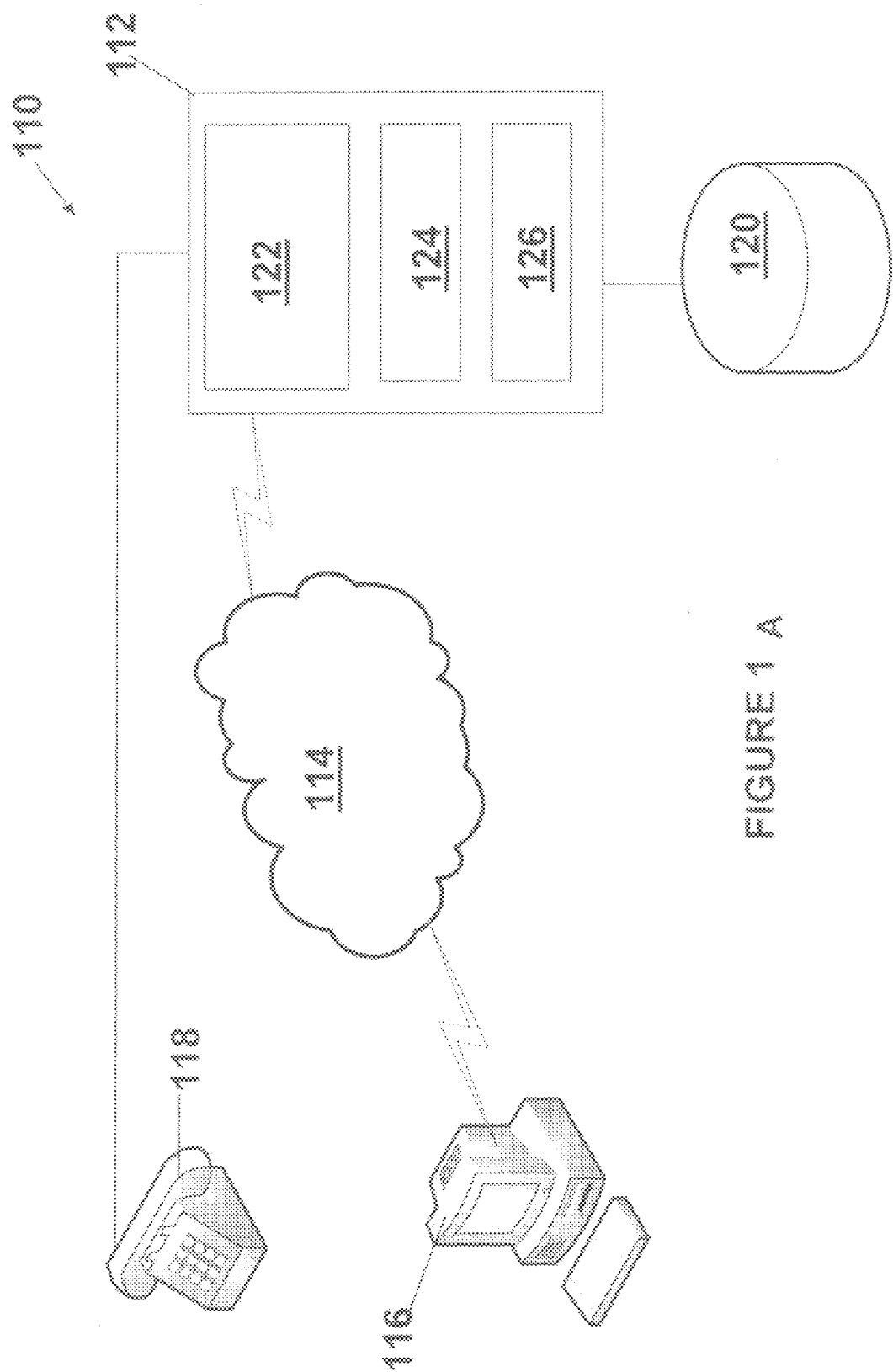
FIG. 1A is an example of a computer-based system that implements an audio clip system in accordance with the invention.

FIG. 1A is an example of a computer-based system 110 that implements an audio clip system in accordance with the invention. The system may include an object hosting unit 112 that may host a web site on which objects, such as pictures, are stored and then displayed to a user who accesses the object hosting unit 112 over a communications link 114 using a computing device 116, such as a personal computer, with a browser application. The computing device may be a personal computer, mobile telephone, PDA, Blackberry device, wireless email device, portable computing device such as a Windows CE-based device or any other computing device with sufficient processing power, memory and connectivity to be able to access the object hosting unit 112. The object hosting unit 112 is preferably one or more server computers such as web server. As described in more detail below, the user may operate a voice-based system 118, such as a voicemail system in a preferred embodiment, in order to record an audio clip that is communicated to the object hosting unit 112.

The object hosting unit 112 may further include a web server 122 (preferably implemented in software executed by the object hosting unit) that pulls information from a data store 120 to generate a web page that contains one or more pictures/images. The web server is also capable of receiving information from a user entered into a web page and process that information. The object hosting unit may further include an audio clip processing unit 124 and an audio clip association unit 126 that may both preferably be implemented in software executed on the object hosting unit. The audio clip processing unit 124 processes the incoming streaming audio data (sent from the voicemail system) and converts the streaming audio data into an audio clip file. The audio clip association unit 126 associates the audio clip file with the appropriate object stored in the data store 120 so that the user can access the object and the associated audio clip. Now, a commercial implementation of the system is described with reference to FIG. 1B.

Figure 1B:
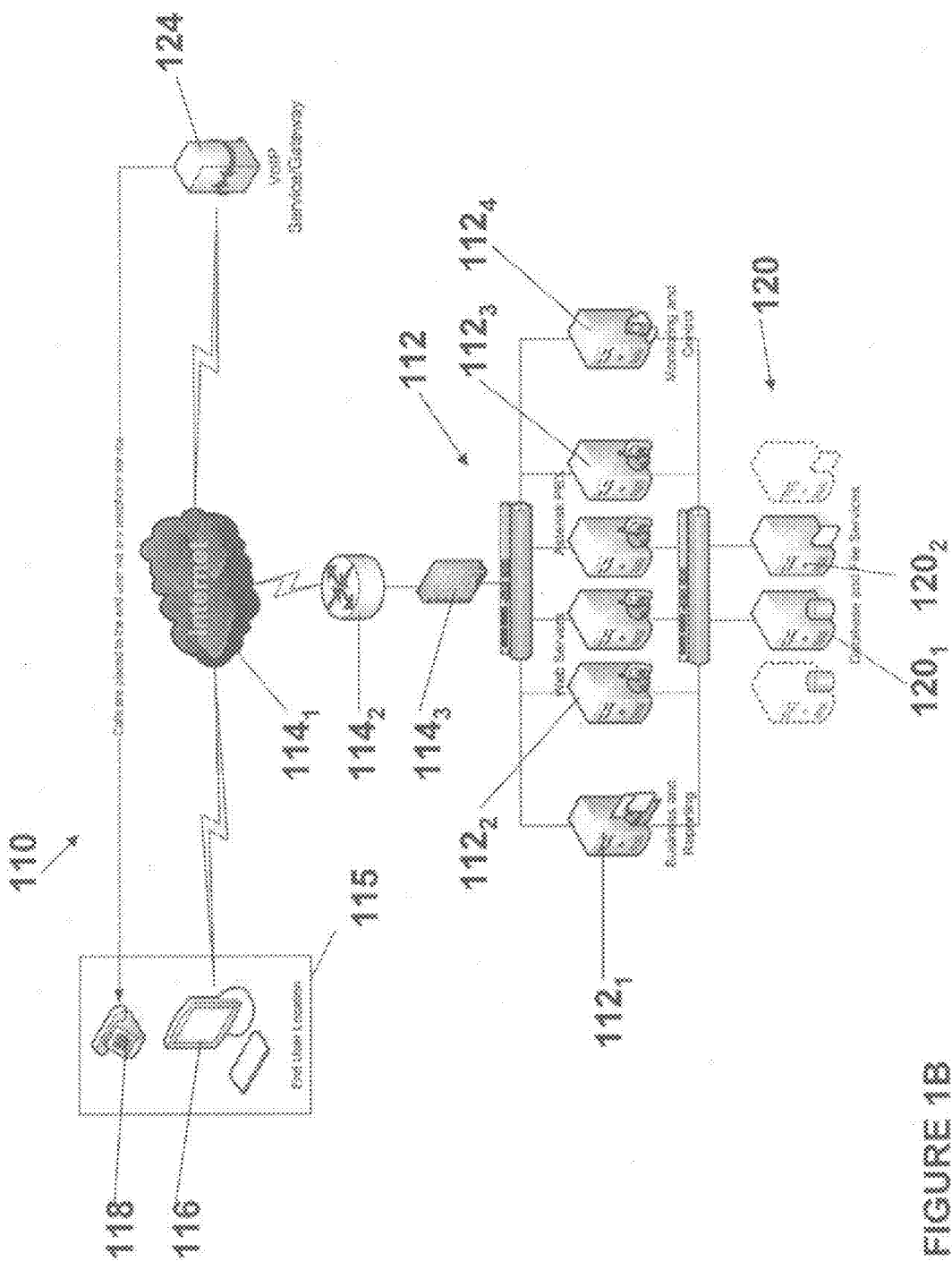
FIG. 1B illustrates an exemplary embodiment of an implementation of the audio clip system.

FIG. 1B illustrates an exemplary embodiment of an implementation of the audio clip system 110 that uses a client/server web-based architecture. This implementation may be known as the VoiceCaptionIt—Image Voice Captioning Service. The VoiceCaptionIt Service may present a solution that extends internet communities into the sharing of voice captioned images by providing an easy to use recording and annotation system that eliminates complexities introduced when a user attempts to use their computer microphone to do computer based recording. The system, in an exemplary embodiment, uses an intuitive web interface and Voice over IP technology (VoIP) with standard telephone networks enabling the user to simply speak into a telephone handset to record their captions. In an exemplary embodiment, the system 110 may be built using open source technologies (operating systems, application servers, development environments and management tools) and leverages those technologies. In the exemplary embodiment, the system may use the following available technologies: SUSE Linux version 10.1 as an operating system, the Apache version 2.2.0 application as the web server, MySQL version 5.0 as a database server, the Asterisk Open Source PBX version 1.2 for telephony integration, the Java Server Pages (Tomcat 5.5) and Java Server Applications as a development environment and the Zabbix version 1.1 for system management.

The system 110 couples one or more user locations 115 over the communications link 114 to the object hosting unit 112. In this implementation, each user location may include the computing device 116 and a voice-based device 118. As with the system shown in FIG. 1A, the voice-based device, such as a telephone, cellular phone, voice over IP phone, etc., may be used to provide an audio caption for the images wherein the audio caption is gathered by the audio clip processing unit 124 that may be a voice over IP service gateway. In the system, the voice-based device, which is ubiquitous today, is used as a mechanism to capture an audio caption. The process by which the user is prompted to provide that audio caption can include either the user dialing a number to connect to the audio clip processing unit 124 or alternatively, the system can call the user at a predetermined phone number (provided to the system by the user as a setting) in order to capture the audio caption. The audio clips gathered and processed by the audio clip processing unit 124, which are converted into digital format, are passed over the communications link 114 to the object hosting unit 112. In the implementation shown in FIG. 1B, the communications link 114 may include a network $114_1$ such as the Internet, World Wide Web, local area network, wide area network, wireless network for example, a router $114_2$ and a well known firewall $114_3$. The communications link 114 may be used to connect the computing device 116 of the user to the unit 112 and the audio processing unit 124 to the unit 112 wherein the various units and devices can establish communication sessions with each other and then communicate with each other over the communications link.

The object hosting unit 112, in this implementation, may include one or more server computers that implement the operations of the object hosting unit wherein the servers are well known server computers that execute software and software applications to perform the various functions described below. In particular, the object hosting unit may include one or more business and reporting servers $112_1$ that handle various business and reporting function of the system, one or more web servers $112_2$, one or more Asterisk PBX servers $112_3$ and one or more monitoring and control servers $112_4$ that perform system management functions of the system.

The one or more web servers may provide web services for the system wherein the web services consist of a front end application logic that dynamically creates the web pages (examples of which are described below with reference to FIGS. 5-19) that are presented to the end user (the user interface) based on their user account, desired view on the current page and/or steps within a process within one of the interactive user pages. These web services also interact with the other component services to collect/display data, retrieve/store files and or control telephony integration like voice recording, playback and calls to the user. Each web server may also securely authenticate the user when they sign into the service (via standard SSL functionality). The Web servers are configured to scale out (horizontally) as service load increases via system based load balancing (at smaller scale) and/or network based load balancing (as scale increases).

The one or more asterisk PBX servers provide telephony services that contain the key functionality that ties the web experience to the VoIP and standard telephone networks. These services consist of the PBX and middle tier applications that manage the state of the calls, interface with the web application, convert the voice to audio and store the files on the file servers. In more detail, the one or more asterisk PBX servers run the open source Asterisk PBX service which is capable of pure VoIP telephony integration and customizable call control via its software interfaces. Each Asterisk PBX server connects to multiple VoIP "telephone lines" that can be used to call the end user for the purpose of recording captions/comments. The VoIP allows the service to call any type of telephone service that uses a telephone number (e.g. standard phone networks, cell phone networks and other IP phone networks). The server also contains the functionality that allows for the conversion of the user captions/comments to a storable and playback compatible audio format. Like the web servers, the one or more asterisk PBX servers are also configured to scale out as load to service increases or the demand for phone lines increases.

The data store 120 in this implementation may include one or more database servers $120_1$ and one or more file servers $120_2$ wherein these servers provide the database services and file services, respectively, for the system 110. The database services are used to access and/or store user specific information (e.g. account information, picture information, categorizations, story boards, image to audio clip associations, etc). The database services consist of the actual database server and any components that have been written to access and or manipulate the data. A custom database schema has been designed for the service and then used with the MySQL application as the database server. The database servers run database services and contain the user profile information along with the pointer information for each image and its associated audio file(s). The database service will scale up as user capacity needs to grow until a point is reached where users will have to be federated off to multiple database servers. Redundancy for database services is addressed via disk dumps to other online storage.

The file services consist of one or more file server(s) that are used to store image files and their associated caption audio clips. The SUSE Linux file share services are leveraged and the files are accessed via a file services layer in the application. In more detail, the file servers run simple and scalable network attached file services where both the image and audio files are stored in unique user directories. The file services are designed to scale both out and up.

Figure 2:
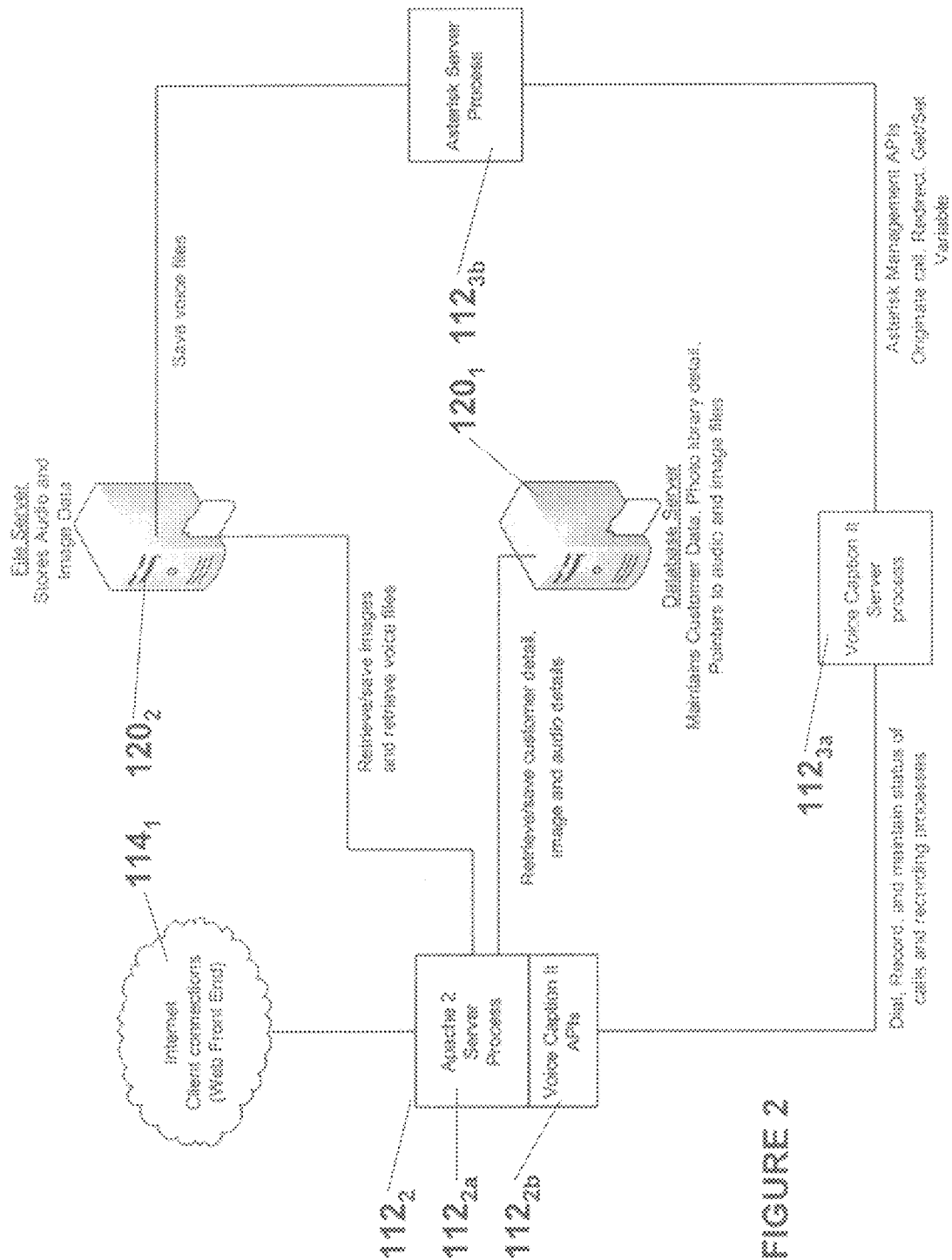
FIG. 2 illustrates the software interaction of the system shown in FIG. 1B.

FIG. 2 illustrates the software interaction of the system shown in FIG. 1B. A client application on the computing device, such as a typical browser application in this web-based implementation, permits a user (a customer of VoiceCaptionIt) to establish a session with and then interact with the service provided by the system over the link $114_1$ via a dynamically created web interface. An Apache 2 Web Server process $112_{2a}$ executing on the web servers $112_2$ delivers the user interface and interacts with many of the components of the system (as shown in FIG. 2) via a set of Application Programming Interfaces (APIs) $112_{2b}$ that deliver the service. As shown, the Apache process $112_{2a}$ may retrieve/save images and retrieve voice files from the one or more file servers $120_2$ and/or may retrieve/save customer detail, image and audio details using the one or more database servers $120_1$. This architecture allows for high performance, scalable and extensible access to file services, database services and to a VoiceCaptionIt server process $112_{3a}$ that controls the telephony integration that makes the use of a standard telephone possible. The APIs $112_{2b}$ dial, record and maintain the status of the calls and recording processes using the server $112_3$.

The server process $112_{3a}$ permits the integration of a traditional web application/service with telephone networks via a VoIP PBX. This process controls the dialing, recording and process flow of a user telephone session in addition to tracking and communicating the state of the voice sessions and the VoIP "phone lines". It ties the web front end and VoiceCaptionIt APIs together with the Asterisk PBX APIs creating the ability to call the user, record a caption and associate the caption or a voice comment with a specific image.

The Asterisk server process $112_{3b}$ provides the telephony services and APIs that are controlled by the VoiceCaptionIt server process. These are called in-order to place (originate) calls, to control VoIP connectivity (phone lines), to manage voice automation (call trees) and to convert calls to caption or comment (audio) files.

Figure 3:
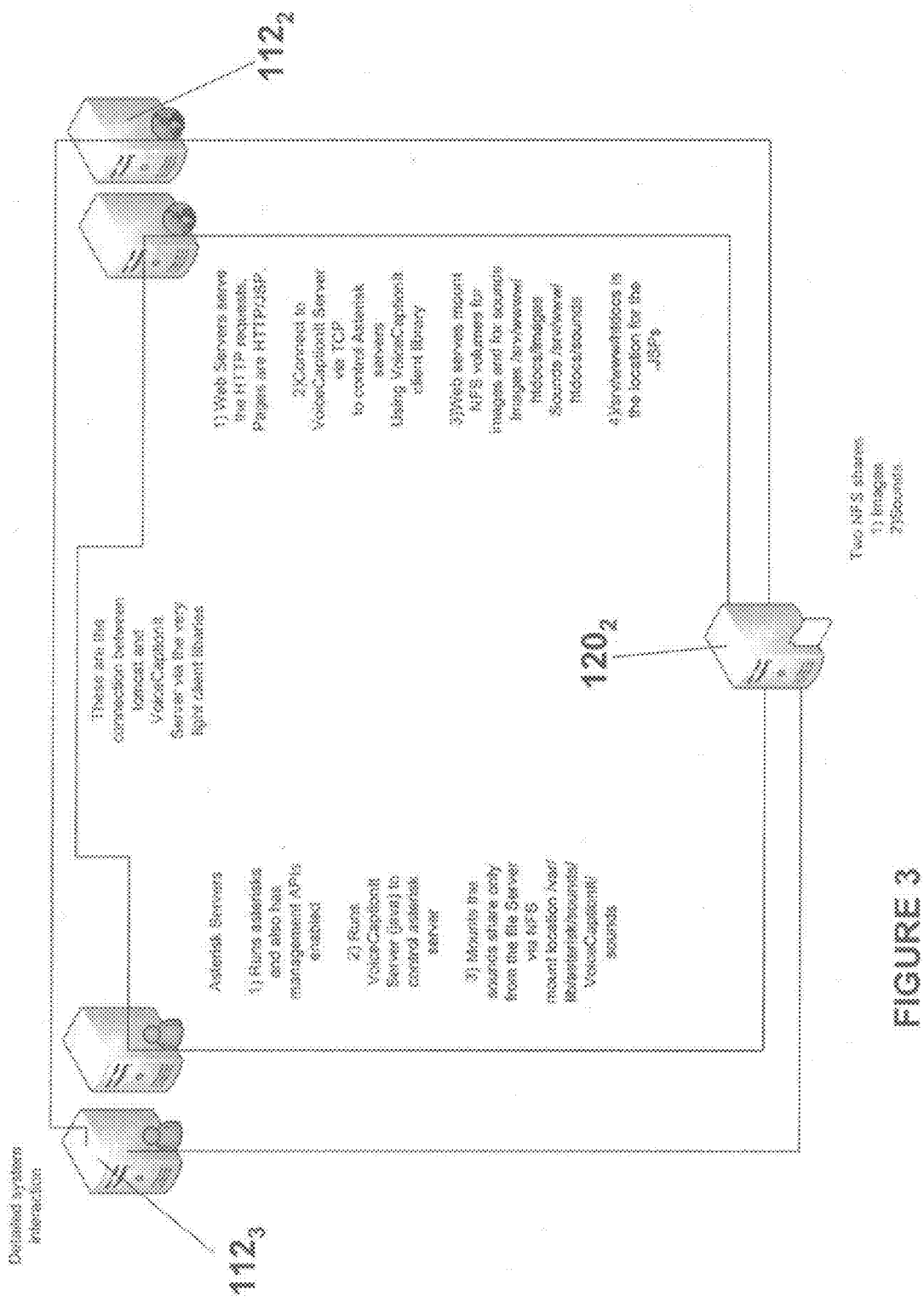
FIG. 3 illustrates the sub-system interaction of the system shown in FIG. 1B.

FIG. 3 illustrates the sub-system interaction of the system shown in FIG. 1B wherein the one or more Asterisk servers $112_3$, the one or more web servers $112_2$ and the one or more file servers $120_2$ interact with each other. The one or more file servers store the images and sounds/audio of the system wherein the images may be digital photographs and the audio may be audio clips associated with the digital photographs in the exemplary embodiment. The one or more Asterisk servers and the one or more web servers may be connected to each other using a set of client libraries. The one or more Asterisk servers may perform one or more of the following actions and functions: run asterisks and also has management APIs enabled; run the VoiceCaptionIt server (implemented using JAVA in the exemplary embodiment) to control the asterisk server; and/or mounts the sounds share only from the one or more file servers via the NFS mount location /var/lib/asterisk/sounds/VoiceCaptionIt/sounds in the exemplary implementation. The one or more web servers may perform one or more of the following actions and functions: serve HTTP requests with pages that are HTTP/JSP (hypertext transfer protocol/Java server protocol) pages; connect to the server process via TCP to control the Asterisk servers using the client libraries; mount NFS volumes for images and for sounds with images at /srv/wwww/htdocs/images and sounds at /srv/wwww/htdocs/sounds in the exemplary implementation; and/or store the JSPs at /srv/wwww/htdocs in the exemplary implementation of the system.

The system may include fault tolerance that is handled using fault tolerant capabilities built into the operating system, application servers and development environment coupled with the monitoring and automation system. The system may include user authentication to the system that is protected by SSL encryption and all user passwords are encrypted before being stored in any system. The system level security is managed through automated security upgrades to the operating system and application servers running on each server role. The system level security may also include system specific access control to prevent the spread of a vulnerability that is limited to a server role or application. The system may also include standard network level security standards including network and host based firewalls, routing controls and monitoring of network port and bandwidth utilization.

The system may also include monitoring and alarm functions, capacity tracking and analysis and performance and availability reporting. As mentioned above, an open source monitoring, alarming, and automation system called Zabbix is leveraged to monitor and control the application and system architecture. Using Zabbix, key scenarios and services are checked by the system and when a failure is detected, scripts are automatically invoked to correct the condition. As additional failure conditions are identified by the system, they will be added to the automation capabilities. Operations personnel may be alerted whenever conditions are not successfully auto-corrected and key service metrics are also tracked by the system.

For the capacity tracking and analysis, basic capacity modeling around CPU utilization, memory usage, disk space and disk I/O coupled with transaction tracking will drive scale out and scale up discussions. The tracking and analysis will be delivered via the monitoring system which allows for robust reporting of capacity indicators. Additional reporting for web log analysis will also be leveraged in building a more robust model. Now, the method for integrating an audio clip is described in more detail.

Figure 4:
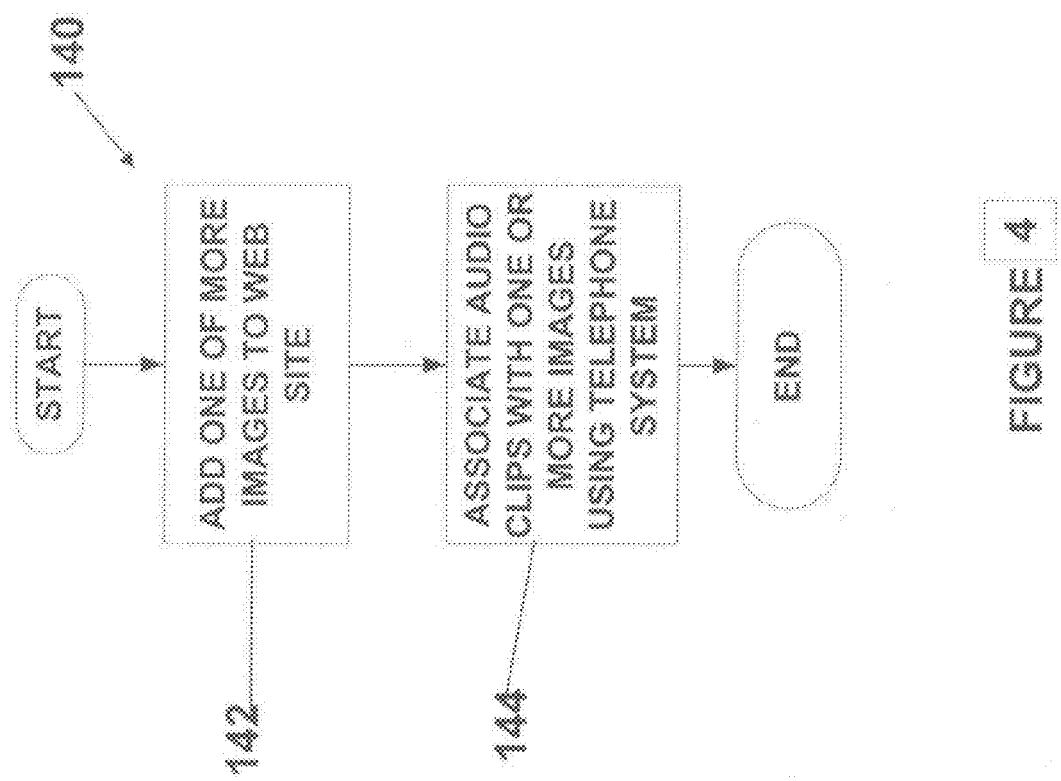
FIG. 4 illustrates a method for integrating an audio clip to an image.

FIG. 4 illustrates a method 140 for integrating an audio clip to an image. In the method, a user adds, using a computing device, one or more objects, such as images, to an object hosting unit, such as a web site, in step 142. At this point, the user is able to access the objects such as with a typical browser application on a computing device. In step 144, the user associates an audio clip with one or more objects stored on the object hosting unit using a voice-based system, such as a voicemail system. The system makes it easy for the user to record the audio data with the proper volume and quality and then associate the audio clip with the object.

To better understand this method, an example of the user flow for a new user visiting the object hosting unit, posting a picture and then associating an audio recording with the picture will be described. In a first step, the new user creates an account with the object hosting unit. It is important to note when this account is created, the user's access control for the entire website is determined. This security system will be integrated with the voice mail system as described below. For example, to create a new account, the user may go to a secure (SSL) web site page and enter basic identity information, such as first name, last name, email address, password, and password reminder. This information will be collected using an industry standard, encrypted system such as ASP, PHP or JSP with the associated secure database system. Once the user has created the account, the user is provided with a numeric code for his audio recording (voice mail box) and a numeric password to access it (just like a voice mail PIN for a typical voicemail system).

The user is now able to post pictures to the object hosting unit. For example, a user may choose to post a picture of a parcel of property where he is building a house. To post the picture, the user goes through the standard process of selecting a file off of his computer's hard drive (or from any other location), making sure it is within reasonable size limits, and then "uploads" it to the object hosting unit in a known manner. Once the picture is uploaded onto the object hosting unit, the user, sitting at his computing device, sees the picture on his/her screen. Examples of the user interface of the system is described below with reference to FIGS. 5-19.

When the user requests to associate an audio file with an image, the user may be presented with a dialog box with a message, such as the following message: "Call our toll-free number at 800-123-4567, enter your account number (12345), your PIN (9876) and then record your message and enter your session number of 4567". The user may then pick up the phone 18 and call the toll free number. The automated attendant asks the user to enter his account number (12345), then asks the user to enter the user's PIN.

Once the user enters his/her PIN number, the user is now in a secure voice mail area where the user can leave one or more messages wherein each message can be an audio clip to be associated with an object. In the example, the automated attendant tells the user to enter the # key when he is done recording his message. As an example, the user says, "In this picture you can see the survey stakes marking the outline of the home. My wife is standing at the edge of where the living room will be and my son has climbed an oak tree that we will look at from our living room" and then he hits the "#" button. The automated attendant may now permit the user to indicate that he/she is satisfied with his message (and if so, press #). In this example, the user presses the "#" button. Then the automated attendant asks for his session number and the user enters "4567" and then hangs up. This session number is uniquely identified with him as a user and with the picture he has posted (using a relational database and global unique identifiers—GUID's for all the content objects in the system). Thus, each audio message left in the voicemail system is uniquely associated with a particular object for a particular user.

In an alternative method for capturing the audio caption of the user, the system may automatically prompt the user to provide the audio caption or voice comment. In particular, once the user has selected to add an audio caption or voice comment to an object, the system automatically contacts the user at a predetermined phone number (which may be a cellular phone, landline or voice over IP based phone and the like) that the user has previously provided to the system. In this method, the system thus automates the audio caption or voice comment capturing process which makes it easier for the user to enter the audio caption or voice comment into the system.

In one exemplary embodiment, a voice mail server pushes the audio file to a streaming audio server (e.g. RealServer or Windows Media Server) where it was converted into an industry standard streaming audio format (e.g. RealAudio, WindowsMedia, WAV, or AU) and posted to a streaming audio media server. The audio GUID is associated with the picture GUID in the global relational database (in the data store) so that the user (and anyone who the user grants access to his photo album) sees the picture and also sees the audio clip indicator 56 next to the picture. If the user clicks on the audio clip indicator (or the picture), the system will stream the audio recording to the end user's computer and the sound will play over their computer speakers. In another exemplary embodiment, the audio file is stored in a format such that a streaming media server is not required.

The system may include picture cropping and there may be a predetermined number, such as 4, of sizes of each image that may be stored on the image server and the corresponding location stored in the database. The image sizes may include native images, large display sizes, medium display sizes and small display size. For the native image sizes, any member can upload an image of any size to VoiceCaptionIt.com. The large display size is the image size used for pages like Landing Page, Photo Details, and Browse. For this large display image, the system needs to resize the Native Image into an image with a maximum X-axis of 500 pixels using the same aspect ratio of the Native Image. The medium display size is the image size used for pages like Highest Rated and My Photos. For this medium display image, the system needs to resize the Native Image into an image with a maximum X-axis of 150 pixels using the same aspect ratio of the Native Image.

For the small display size, this is the image size used for pages like Landing Page (left side), Batch Manager, My Friends, and Browse (left side). For the aesthetics of these pages to work the images need to be 50×50 pixels with no "white space". Since most pictures are not perfectly square, the system will need to pre-process each image in order to store a square image. An example of a process to pre-process the image may include the following steps:

1. Determine the longest axis (X or Y) in pixels
2. Determine the shortest axis (X or Y) in pixels
3. Divide the longest axis by the short axis to get the aspect ratio. If the aspect ratio is greater than 1, skip to Step 5.
4. Resize the image into 50×50 pixels and save
5. Resize the image by converting the shortest axis to 50 pixels
6. Crop the image by removing all pixels>50 on the longest axis This will create a thumbnail with a 50×50 pixel size with no white space. While it will remove some of the picture (from the longest axis) it will preserve the most detail in the image so the user can recognize the Native Image. Now, examples of the web pages generated by the system in the exemplary implementation will be described. It should be understood that these user interfaces can be provided to the user by other means so that the system is not limited to delivering these user interfaces to the user using the exemplary web pages described below.

Examples of the user interfaces when the user is logged into the system are described with reference to FIGS. 5-14 and examples of the user interfaces when a user or interested user are not logged into the system are described with reference to FIGS. 15-19.

Figure 5:
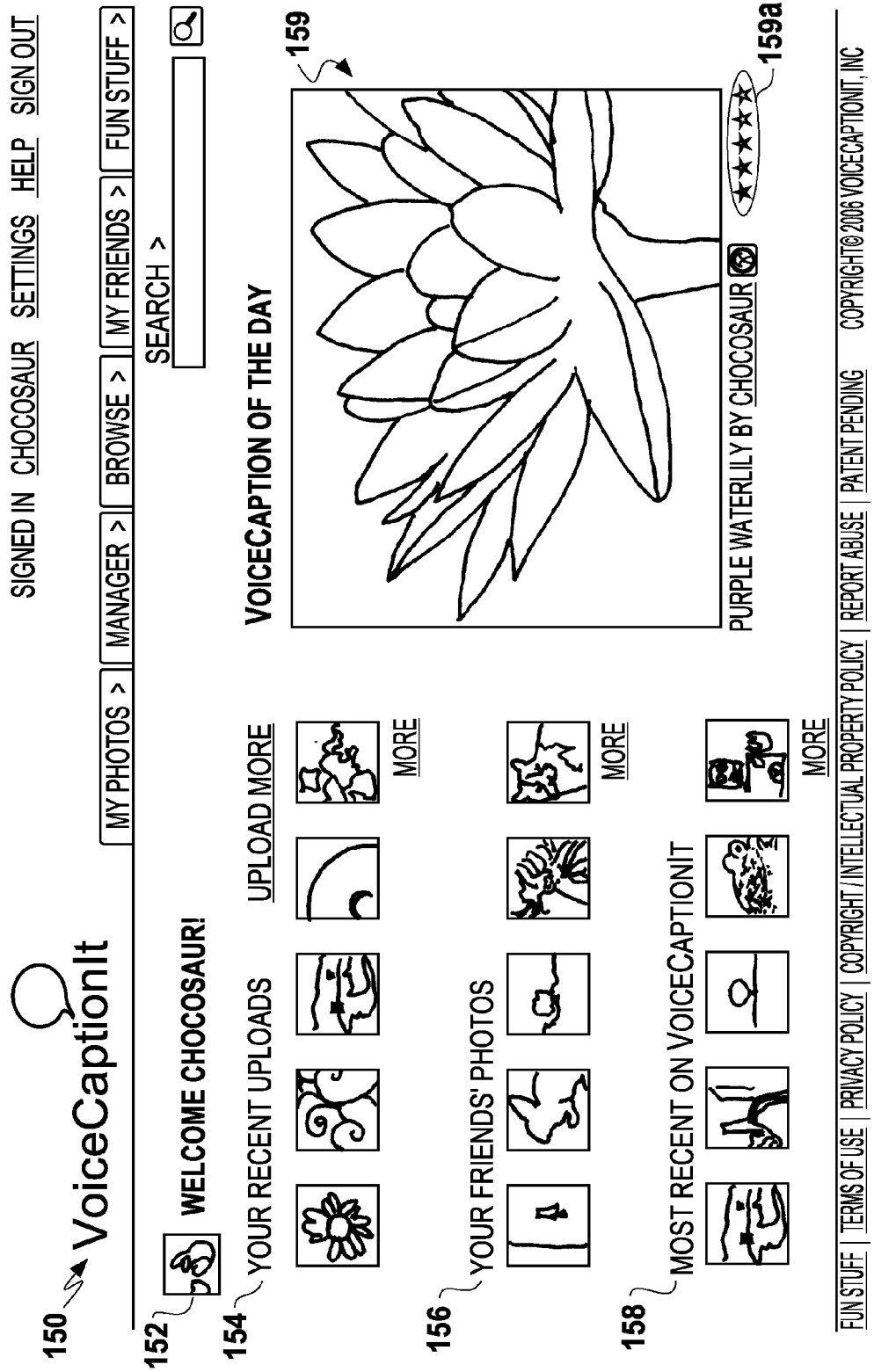
FIG. 5 illustrates an example of a landing page of the system when the user is logged into the system.

FIG. 5 illustrates an example of a landing page 150 of the system when the user is logged into the system. When a user initially signs up as a user of the system, the user may associate an icon with himself/herself as well as other settings that are stored in the profile for the user. The system may then place a cookie on the computing device of the user so that, the web server can read the cookie in order to automatically log the user (chocosaur in this example) into the system. The database server can then push down the "icon" (picture) 152 for the logged in user, based on what the user set up in their profile.

As shown in FIG. 5, the user interface of the landing page may include a recent uploads by the user portion 154, a friend's portion 156, a most recent uploads by any user portion 158, a VoiceCaption of the day 159 that may include a rating 159a. For the recent uploads by the user portion 154. the database pushes down (communicates over the communications link to the computing device) a predetermined number, such as 5 as shown in FIG. 5, of most recent photos uploaded to the site by the user that is logged in (chocosaur in this example). The database may push down the pictures using the smallest thumbnail (50×50 pixels) size photo and the recent upload may be in chronological order.

For the friend's portion 156, the database pushes down a predetermined number, such as 5 as shown in FIG. 5, of most recent photos uploaded to the site by friends of the user that is logged in. For example, chocosaur is logged in and she has 3 friends: Dave, Eddy and Bill. In one example, Dave uploaded one new picture yesterday, Eddy uploaded 3 new pictures today, and Bill uploaded 5 new pictures yesterday. The database will need to analyze the date & time stamp of all 9 pictures, sort them and push down the 5 most recent pictures. The database will need to know who is logged in, who all your friends are, and when they uploaded their pictures in order to be able to provide the friend's portion. The images shown in the friend's portion may be in chronological order, using the smallest thumbnail (50×50 pixels) size photo.

For the most recent uploads by any user portion 158, the database pushes down the a predetermined number, such as 5 as shown in FIG. 5, of most recent photos uploaded to the site by anyone. To accomplish this, the database analyzes the date & time stamp of all recent pictures during a predetermined time period, such as the last 24 hours, sorts them and pushes down the most recent ones wherein the images may be in chronological order and may use the smallest thumbnail (50× 50 pixels) size photo.

For the VoiceCaption of the day 159, the database may push down a VoiceCaption of the Day (a picture with its linked VoiceCaption) along with the title of that picture, the user who uploaded it and it's overall rating 159a (for example using a 5 star system) as shown in FIG. 5.

Figure 6:
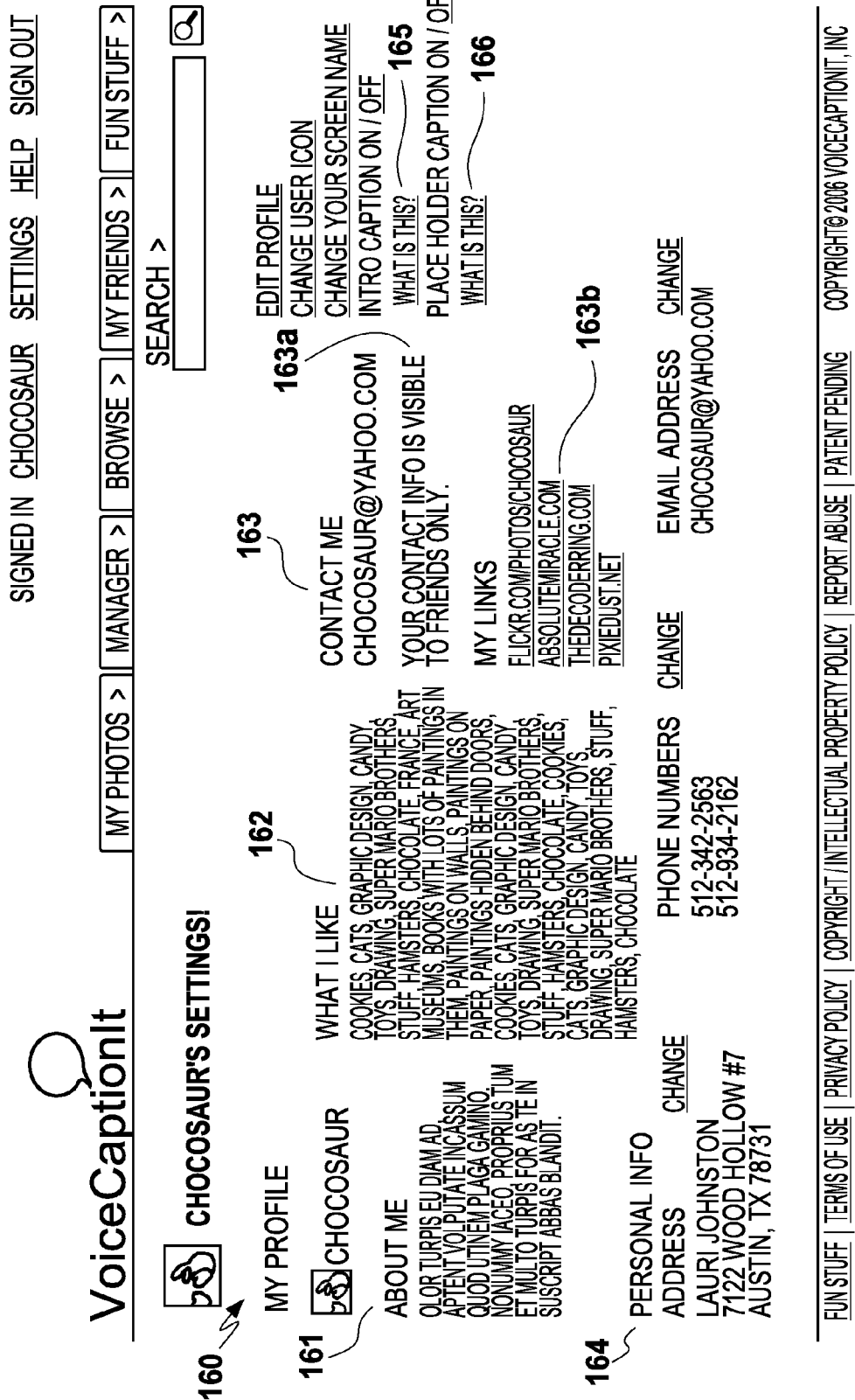
FIG. 6 illustrates an example of a setting page of the system when the user is logged into the system.

FIG. 6 illustrates an example of a setting page 160 of the system when the user is logged into the system. This page permits the user to update/edit the profile for the user. The page may include an "About Me" portion 161, a "What I Like" portion 162, a "Contact Me" portion 163 including a permission portion 163a and a "My Links" portion 163b, a personal info portion 164, an intro caption portion 165 and a place holder caption portion 166. When the user is logged in and navigates to the setting page, the database pushes the various information contained in this page. The "About Me" portion 161 contains a character/text field of up to a predetermined number, such as 1024, characters that permit the user to enter information about themselves that will be displayed to other users of the system. The "What I Like" portion 162 contains a character/text field of up to a predetermined number, such as 2048, characters that permits the user to specify the likes of the user. The "Contact Me" portion 163 contains the email address of record in the system. The permission portion 163a lists the permission for seeing the contact info which is "Your contact info is visible to Friends only" in the example shown in FIG. 6. The permission may have 3 possible states in the database: "Only you can see your contact info.", "Your contact info is visible to Friends only", and "Everyone can see your contact info.". One of these 3 statements will be shown based on the user preference set in their profile. The "My Links" portion 163b permits the user to enter up to a predetermined number, such as 5, of separate URL's for their favorite sites in their profile and the database will push those down to this page based on the user login.

The personal info portion 164 may contain information entered into the user profile including an address, phone numbers (up to three in this example), an email address that is unique to each user wherein the email address can be changed and the user's icon as described above. The intro caption portion 165 permits each user to toggle this feature ON/OFF and permits the user to record a short (such as 1 minute) voice introduction about themselves. When another user browses their profile (assuming their profile can either be viewed by their Friends or Everyone) they will be able to listen to their voice profile. For this screen the database will need to send down the state (on or off) of the intro caption.

The place holder caption portion 166 permits each user to toggle this feature ON/OFF and permits the user to create a simple, generic VoiceCaption caption the system will use in the event they haven't created one for a particular picture. For example, imagine the scenario where a user has uploaded 50 photos and starts to voice caption them but runs out of time. During that time someone browses his photos and is listening to the voice captions. They would get to a photo with a Place Holder Caption and likely hear something like, "Sorry, I just uploaded this photo and haven't had time to voice caption it yet. Please check back tomorrow."

Figure 7:
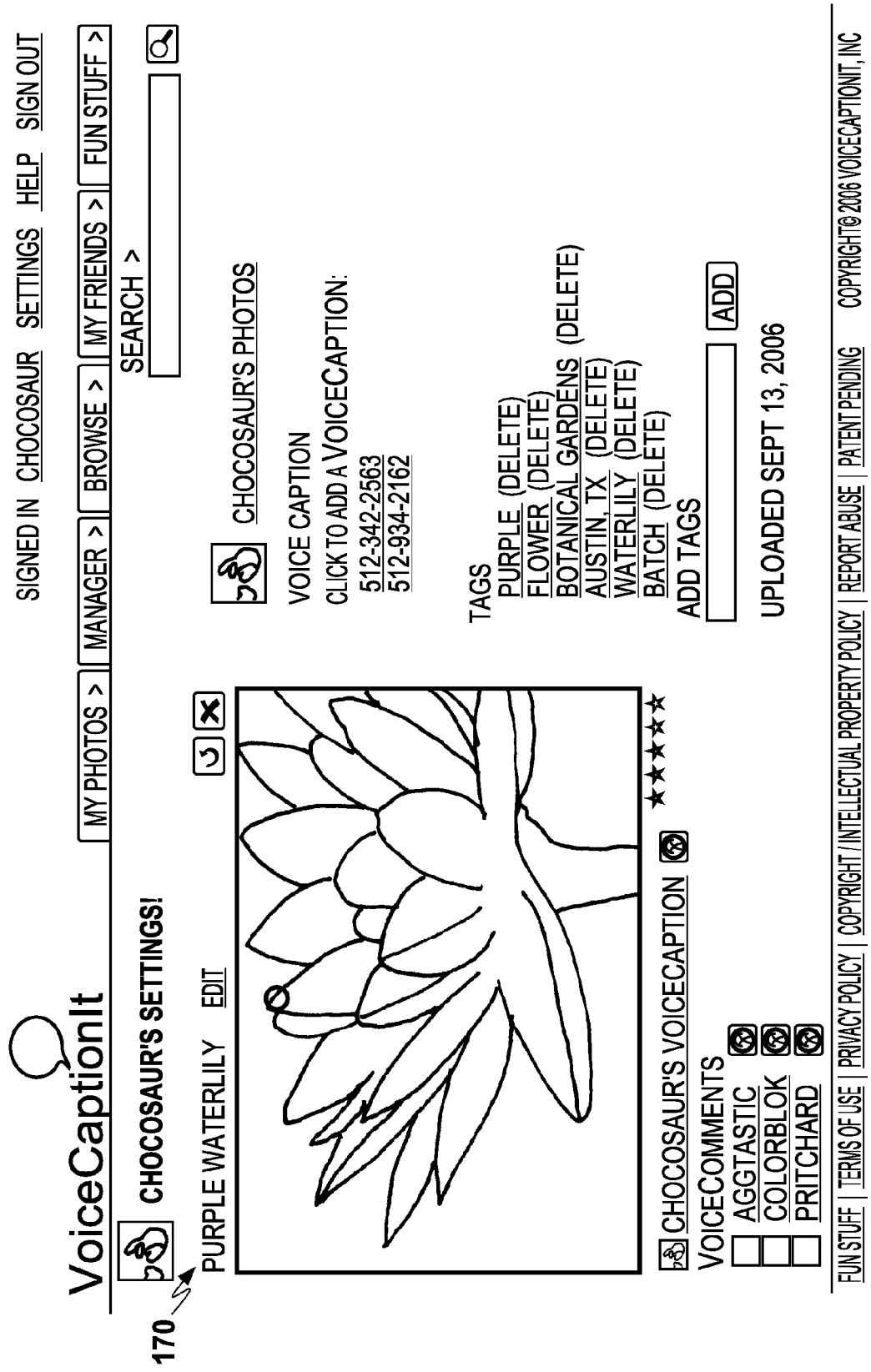
FIG. 7 illustrates an example of an image detail page of the system when the user is logged into the system.

FIG. 7 illustrates an example of an image detail page 170 of the system when the user is logged into the system. To populate this page for the user, the database sends down various information to display this page to the user. The information contained on this page includes:

Image title (e.g. Purple Waterlilly)
Location of image Voice Caption (e.g. chocosaur's Voice-Caption)
Location of all Voice Comments regarding the original Voice Caption (e.g. AggTastic, colorblok and Pritchard). These may be in chronological order and the page may display the date/time stamp for each VoiceComment.
Overall rating (same as above)
The location of the users photos (e.g. chocosaurs' Photos)

All the phone numbers entered in the user profile (there is a limit of 3)

All the tags entered for this image (a limit of 10) wherein each image can be tagged to permit searching for images that meet a certain criteria Date/Time stamp for when the image was uploaded to our servers (note: this is not the date the picture was taken. The information may also include all of the information about the photo captured by many digital cameras these days.)

This page is also where a logged-in user can rate an image or add a VoiceCaption for the image.

Figure 8:
FIG. 8 illustrates an example of an upload images page of the system when the user is logged into the system.

FIG. 8 illustrates an example of an upload images page 180 of the system when the user is logged into the system. This page allows the user to find images locally (hard drive, memory stick, external drive, etc.). Therefore, there is little information the database or server needs to send to the user. The user can select up to a predetermined number, such as 10 in this example, of images to upload and then select the permission associated with the images. The permission selected applies to ALL images uploaded at that time. For this page, the database pushes down the icon (image) for the user and the user's name.

Figure 9:
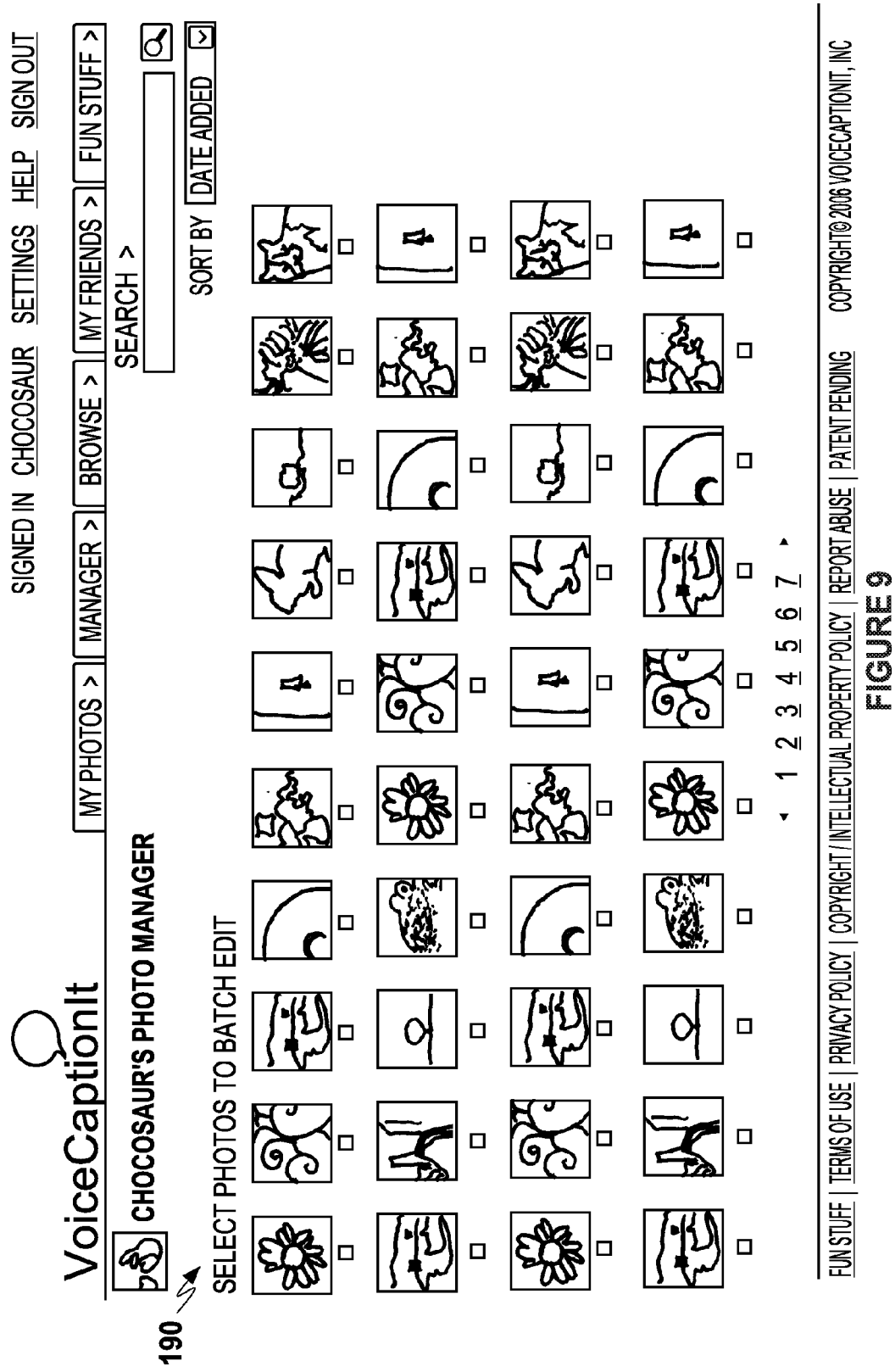
FIG. 9 illustrates an example of a batch manager page of the system when the user is logged into the system.

FIG. 9 illustrates an example of a batch manager page 190 of the system when the user is logged into the system. This page allows the user to select which images they want to "batch edit", meaning the user can select multiple images and then perform the same actions on them over and over (on the Photo Detail page). For this page, the database sends the smallest thumbnail (50×50) version of the pictures of the user to the browser, filling up the page with a maximum of 40 images (4 rows of 10 columns each). The database needs to maintain a total count of all images for a user and then divide that by 40 to calculate how many pages to display at the bottom (navigation).

The user can select to sort what images to batch edit (see the sort by portion at the upper right corner of the user interface) by:

Date added—this is the date the images were uploaded to our server, with images presented most recent to oldest (chronological order).

No tags—this sorts all images that do not have text tags to the top. The images may be sorted in chronological order, meaning once the database has identified all images that don't have text tags, it should then send them down in order of most recently uploaded to oldest.

No VoiceCaption—functions just like "No tags" above, but for all images that don't have a VoiceCaption (note: images that are using a Place Holder Caption should be treated as not having a VoiceCaption).

The database also needs to send down the logged in user icon (next to "chocosaur's Photo Manager" in this image).

Figure 10:
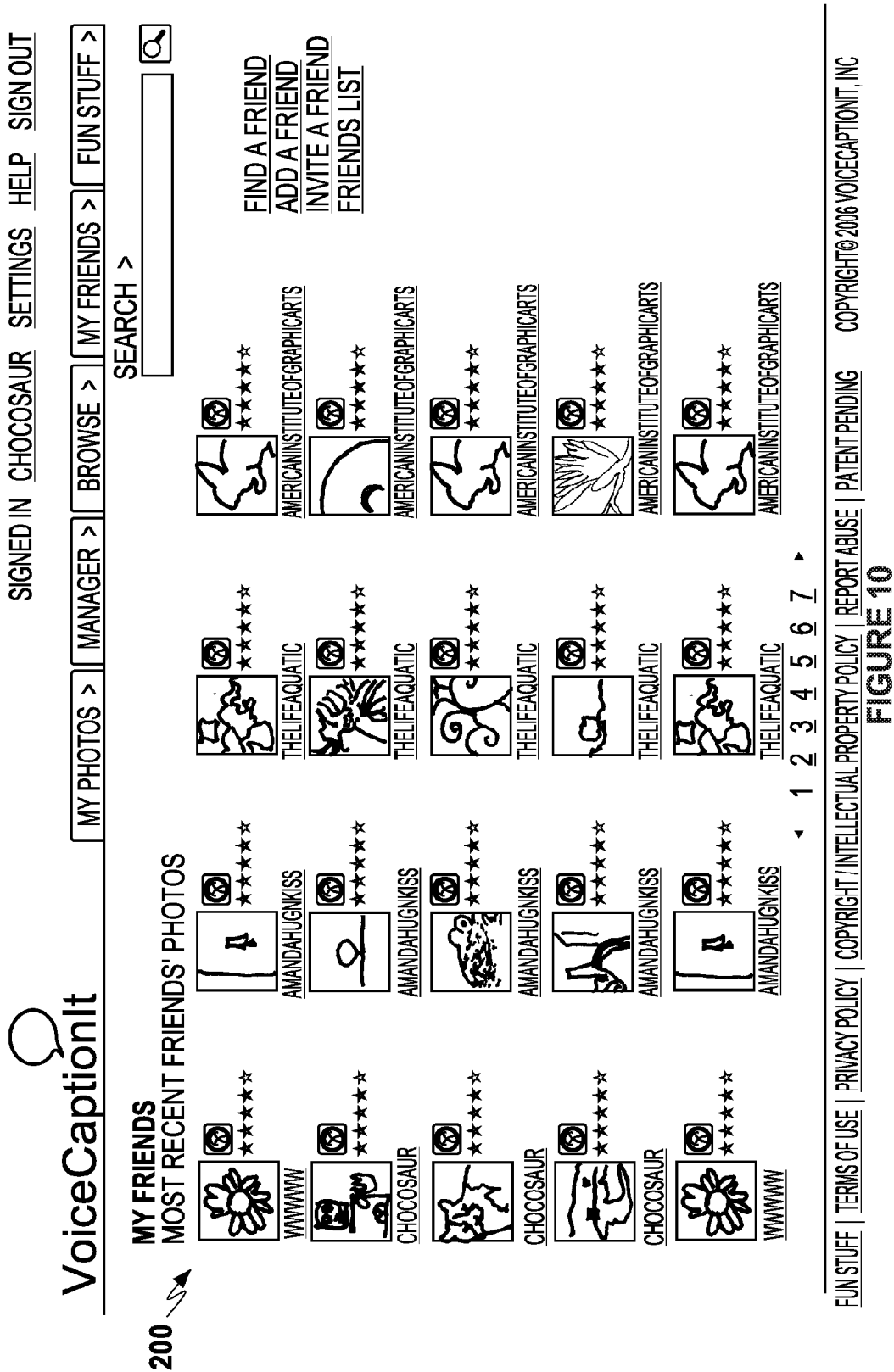
FIG. 10 illustrates an example of a my friends page of the system when the user is logged into the system.

FIG. 10 illustrates an example of a my friends page 200 of the system when the user is logged into the system. This page allows the logged in user to see the most recent images posted by your friends, 20 at a time. In one implementation, this page is just for viewing images (go to the photo detail page to add a rating and/or a VoiceCaption) although the page can also be used to rate images and/or add VoiceCaptions to the images. For this page, the database sends the smallest thumbnail (50×50) version of all of the pictures to the browser, filling up the page with a maximum of 20 images (5 rows of 4 columns each). The database needs to maintain a total count of all images for a user and then divide that by 16 to calculate how many pages to display at the bottom (navigation). The pictures should be displayed in chronological order, most recent first. The database may also send down the rating for each image and/or the VoiceCaption for each image. The database may also send down the user name for each of your friends images and the location of each VoiceCaption associated with each image. The right hand navigation links (Find A Friend, Add a Friend, Invite a Friend, and Friend's List) all lead to separate pages of the system that permit the user to perform different friend-related functions.

Figure 11:
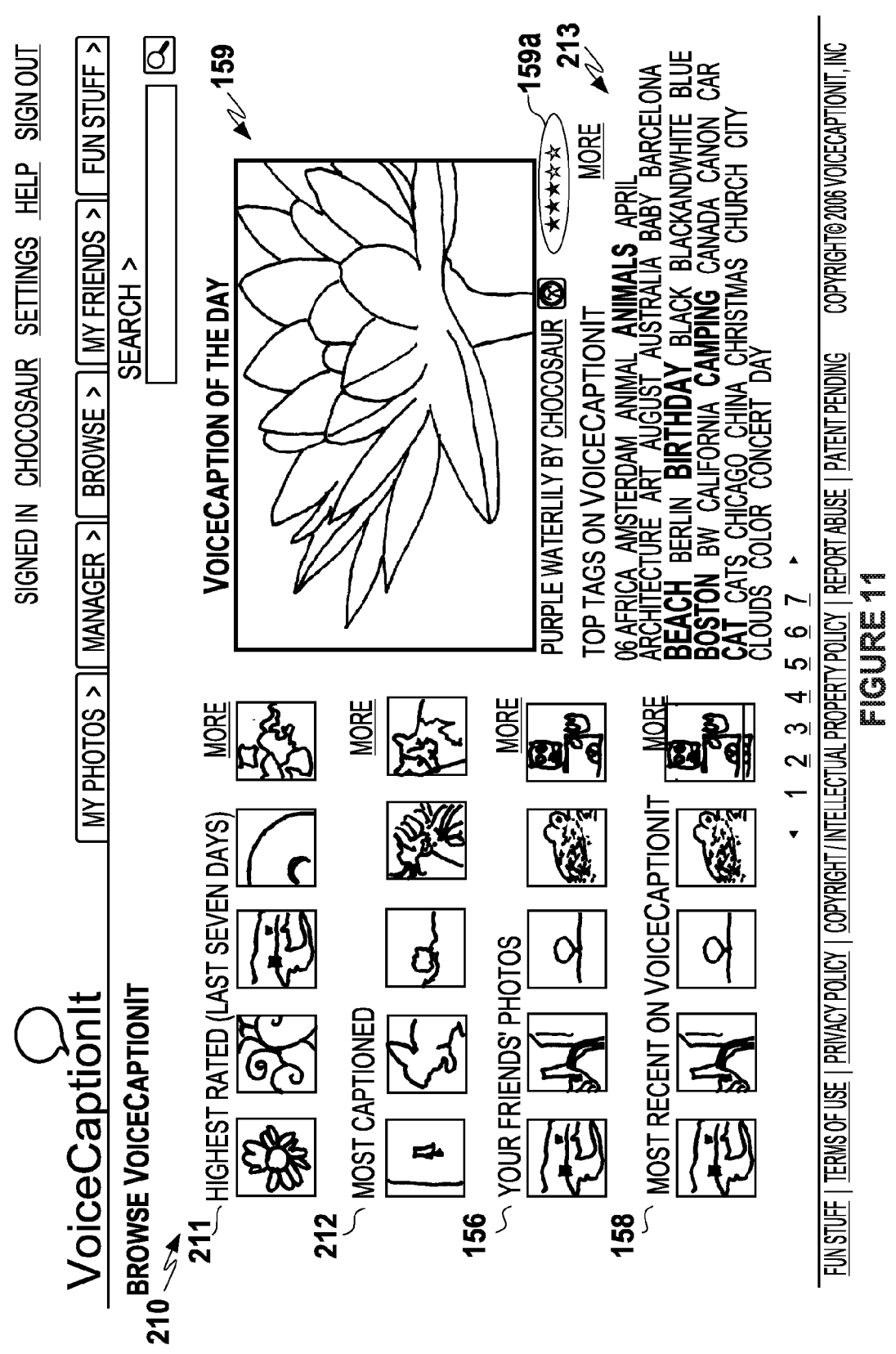

FIG. 11 illustrates an example of a browse page 210 of the system when the user is logged into the system. The page may include the friends portion 156, the most recent portion 158 and the VoiceCaption of the Day portion 159 as described above. The page may also include a highest rated portion 211, a most captioned portion 212 and a top tags portion 213. This page allows a user who is logged in to get a quick "snapshot" of recent activity of their VoiceCaptionIt "world". As with the landing page, the web server may read a cookie in order to automatically log the user in (chocosaur in this example).

For the highest rated portion 211, the database may push down a predetermined number, such as 5, of the highest rated images/VoiceCaptions for the entire site, in chronological order. In the event there are more than 5 images that have the highest possible rating (5 stars—which is quite likely) the database will need to push down the 5 most recent images/VoiceCaptions that are highest rated. The "more" hyperlink will lead to a separate page capable of showing more highly rated images/VoiceCaptions.

For the most captioned portion 212, the database may push down a predetermined number, such as 5, of the highest VoiceCaptioned images (regardless of when they were uploaded to our site). The portion alternatively may display the most VoiceComments images since each image can only have one VoiceCaption. In the event there are more than 5 images that have the most VoiceComments (which is quite likely) the database will need to push down the 5 most recent images with the most VoiceComments. The database may push down the pictures using the smallest thumbnail (50×50 pixels) size photo and keep them in chronological order.

For the tag portion 213, the database may send down a predetermine number, such as 40, of the most used text tags in the system. To do this, the database may maintain a current count of all tags used by all users and sort it from highest to lowest (or at least the 40 highest). The database may separate the 40 most used tags into 5 groups of 8 and add the "group number" to each one of the to 40 tags. Then the database will need to sort the 40 top tags into alphabetical order. The client will then parse and use the appropriate size font (largest font for group #1, smallest font for group #5) for the layout—based on the overall display of alphabetical order.

Figure 12:
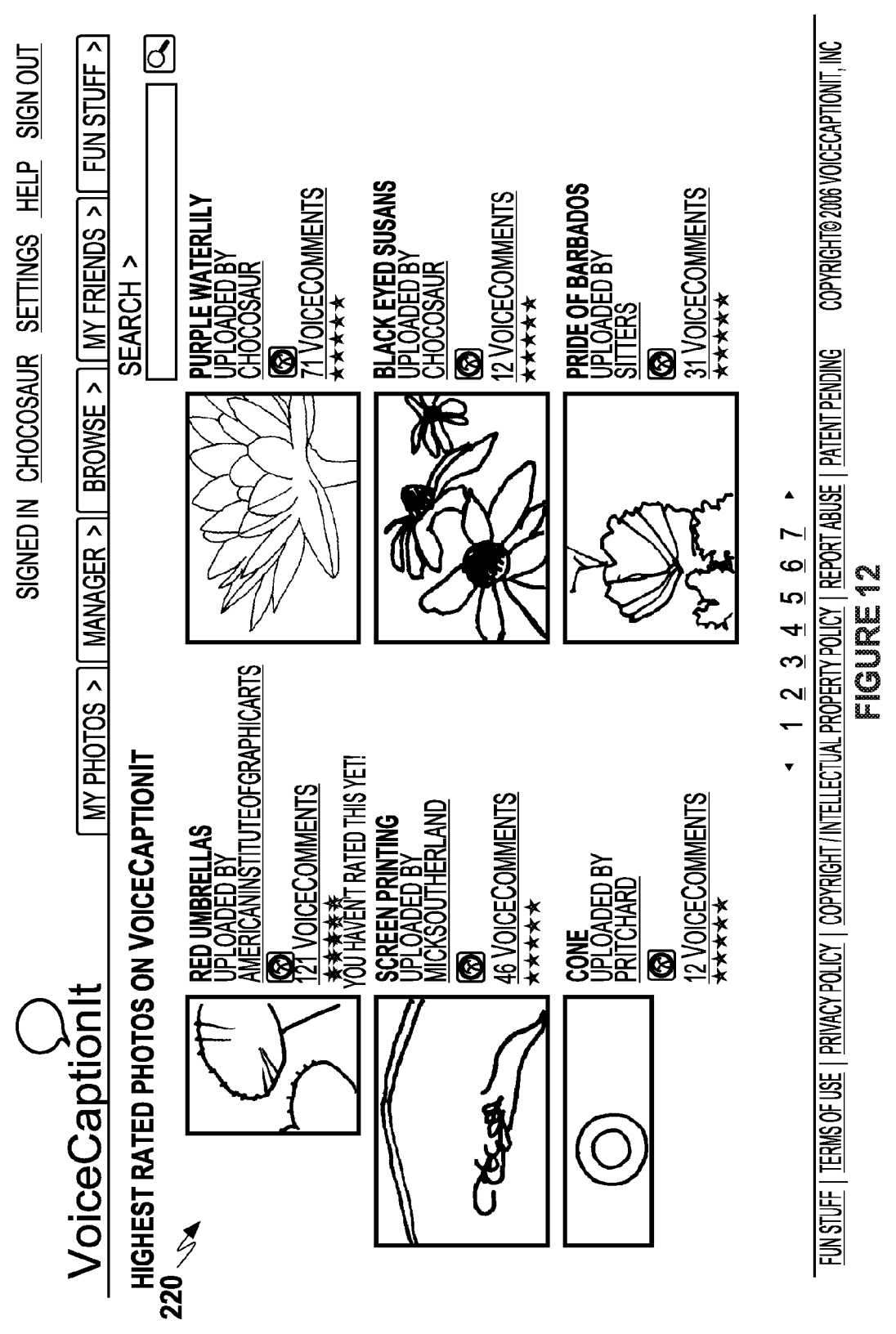

FIG. 12 illustrates an example of a highest rated page 220 of the system when the user is logged into the system. This page shows the highest rated (5 point star system in this example) images/VoiceCaptions on the entire site, a predetermined number, such as 6, at a time.

For this page, the database may keep a count of all "highest rated" images. Given the expected popularity of VoiceCaptionIt, the database should only need to track images/VoiceCaptions with a rating of 4 stars or higher (>=4.0). However, if there are more than 60 of those, then it should limit this to 10 pages of 6 photos each so that the bottom navigation doesn't become impractical. The page may use the Medium size image (150×150).

For each image displayed, the database may provide the following information to the page:
Image title (e.g. Red Umbrellas)
Image owner (who uploaded it, e.g. AmericanInstituteofGraphicArts)
Location of VoiceCaption for the image Total number of all VoiceComments for this image/Voice-Caption Image/VoiceCaption rating The text comment "You haven't rated this yet!" if the user logged in (chocosaur in this example) has not yet rated the image/VoiceCaption. This means the database will have to keep track of all users who have rated each image/VoiceCaption in the system.

Figure 13:
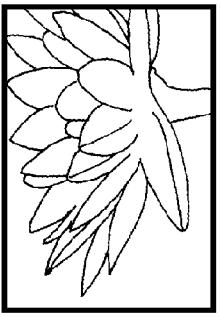
FIG. 13 illustrates an example of a highest rated in time period page of the system when the user is logged into the system.

FIG. 13 illustrates an example of a highest rated in time period page 230 of the system when the user is logged into the system. This page functions the same as Highest Rated above with one exception since it limits the results to images uploaded to our servers in the last predetermined number of days, such as 7 days. This page does need to show "You haven't rated this yet!" for images/VoiceCaptions the logged in user hasn't rated.

Figure 14:
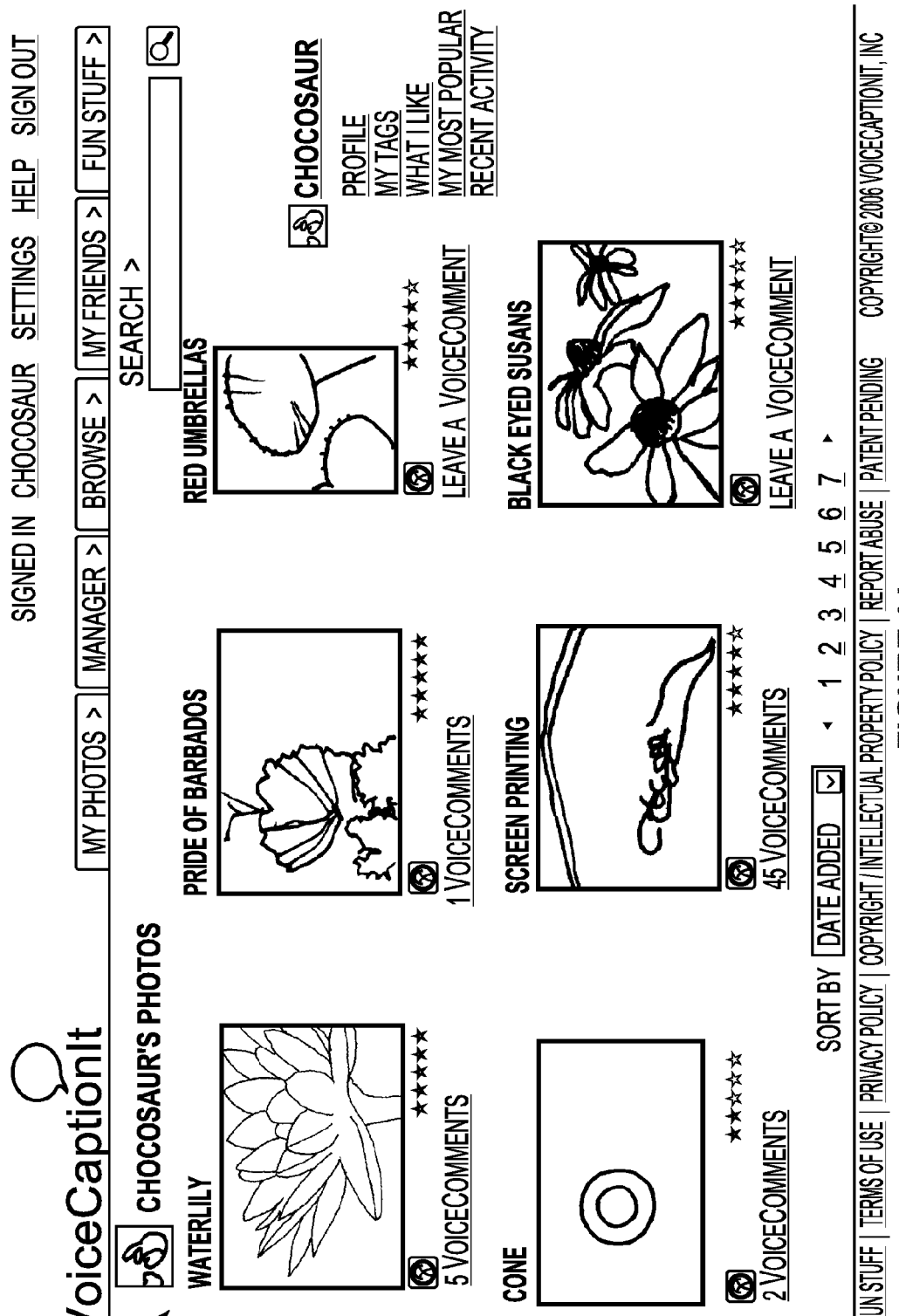
FIG. 14 illustrates an example of a my photos page of the system when the user is logged into the system.

FIG. 14 illustrates an example of a my photos page 240 of the system when the user is logged into the system. This page shows the images of the logged in user, a predetermined number, such as 6, at a time, based on the "sort by" selection made. For each image shown, the database may download the following information to the page:

Image title (e.g. Waterlilly)
Location of image VoiceCaption
Image/VoiceCaption rating (1 to 5 stars)
Total number of VoiceComments made with location (used in hyperlink) of the VoiceComments detail page. In the event no VoiceComments have been left, the database should send down the text "Leave a VoiceComment".

The user can choose to sort the images by:

Date added—this is the date the images were uploaded to our server, with images presented most recent to oldest (chronological order).

No tags—this sorts all images that do not have text tags to the top. They should also be sorted in chronological order, meaning once the database has identified all images that don't have text tags, it should then send them down in order of most recently uploaded to oldest.

No VoiceCaption—functions just like "No tags" above, but for all images that don't have a VoiceCaption (note: images that are using a Place Holder Caption should be treated as not having a VoiceCaption).

Highest rated—unlike the Highest Rated page for the entire site, this should present the logged in user with a stack-ranking of ALL their images, from highest to lowest rating. In the event the user has more than six "5 star" images/VoiceCaptions, the database will need to send them down in chronological order (the six most recent 5 star images/VoiceCaptions, followed by the next six, etc.).

Most VoiceComments—unlike the Highest VoiceComments section on the Browse page for the entire site, this should present the logged in user with a stack-ranking of ALL their VoiceComments, from most to least. In the event the user has more than six images/VoiceCaptions with the most VoiceComments, the database will need to send them down in chronological order (the six most recent images/VoiceCaptions with the most VoiceComments, followed by the next six, etc.).

For each of the above different ways to sort the images, the server keeps track of the total number of images and then divide that by 6 to come up with the page count at the bottom. The "page number display" at the bottom (1-7 in the example) should be limited to 10 pages. However, since this is the only way a user can actually see ALL their pictures, it does need to increment/decrement pages when the user "moves" to the right or left. For example, if a user has uploaded 100 images that would be 17 pages of images. Since this display is limited to 10, then it would show 1-10 to start, but when the user selected page 10 then the "page number display" would change from being 1-10 to 2-11.

For the navigation on the right of the page, the database sends links for the location of the users:

Profile—location of the user's profile
Tags—location of user's "tag list" or can have a tag cloud so the user can see their 40 most used tags
What I like—location of the highest rated images/Voice-Captions on the entire site (rated by the logged in user).
My Most Popular—leads to a page where the logged in user can see their images/VoiceCaptions by:
Highest rated
Most views
Most listens
Most VoiceComments
Recent Activity—leads to a page where the logged in user can see their images by:
Most recently rated
Number of VoiceComments per image
By timeline, which has
Entire time user has been a member
Last predetermined amount of time, such as 6 months, that the user has been a member
Since the last time the user has logged in
In the last day (24 hours)
In the last predetermined number of hours, such as 1, 4, 6, 12 hours.

The database may also send down the user icon (next to chocosaur's Photos in this example). I think we can get rid of the smaller icon used next to chocosaur on the right nav if this is the only place we are using it.

Figure 15:
FIG. 15 illustrates an example of a browse page of the system when a user is not logged into the system.

FIG. 15 illustrates an example of a browse page 250 of the system when a user is not logged into the system. The pages shown in FIGS. 15-19 are displayed to a user who is not logged into the system or a person who is not a user of the system. This page is the same as the Browse page described above, with exception of:

No user log in displayed in the upper-right corner
"Your Friends' Photos" is not displayed
No "Settings" is displayed in the upper-right corner The other aspect are similar to the browse page described above with reference to FIG. 11 and will not be described again here.

FIG. 16 illustrates an example of a learn more page 260 of the system when a user is not logged into the system. The purpose of this page is to share the basic functionality of VoiceCaptionIt.com with visitors that are not familiar with the site. The database may send down a single static image used for "Learn More" along with it's VoiceCaption. The system may record a higher quality WAV file for this image, using a script. The rating will be pre-set (hard-coded) at ⅘. The system may include a canned marketing text for the space on the left (gray box). Alternatively, the system may use a small Flash sequence to show off more of the functionality (e.g. VoiceComments, User Profile, etc.)

Figure 17:
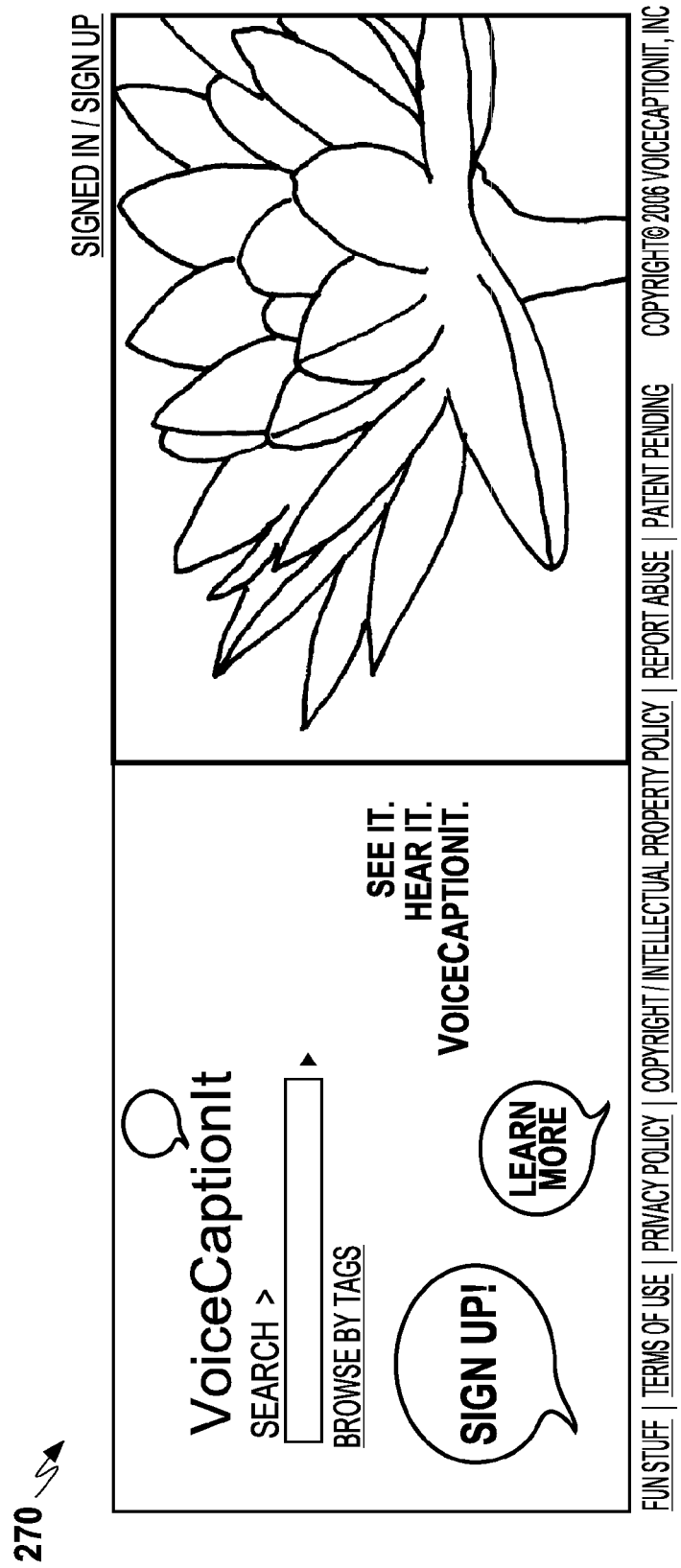
FIG. 17 illustrates an example of a landing page of the system when a user is not logged into the system.

FIG. 17 illustrates an example of a landing page 270 of the system when a user is not logged into the system. The purpose of this page is to entice visitors to join VoiceCaptionIt.com. Visitors to the site will see this page if they have not signed up or if they have cookies disabled on their machine. The image on this page will be static (hard-coded). The user will be able to "Browse" by clicking the hyperlink, which will lead them to the browse page shown in FIG. 15. The Search box will function the same as on all the other pages.

FIG. 18 illustrates an example of a signup page 280 of the system when a user is not logged into the system. The purpose of this page is to allow a non-member to join VoiceCaption-It.com. The client will verify the phone number entered is well-formed for North America (10 digits, whether or not they are separated by hyphens, periods, or whatever). The database server will receive all this information and create a new user record in the database. Since the data schema is keyed off of user name, users will be unable to have the same user name.

Figure 19:
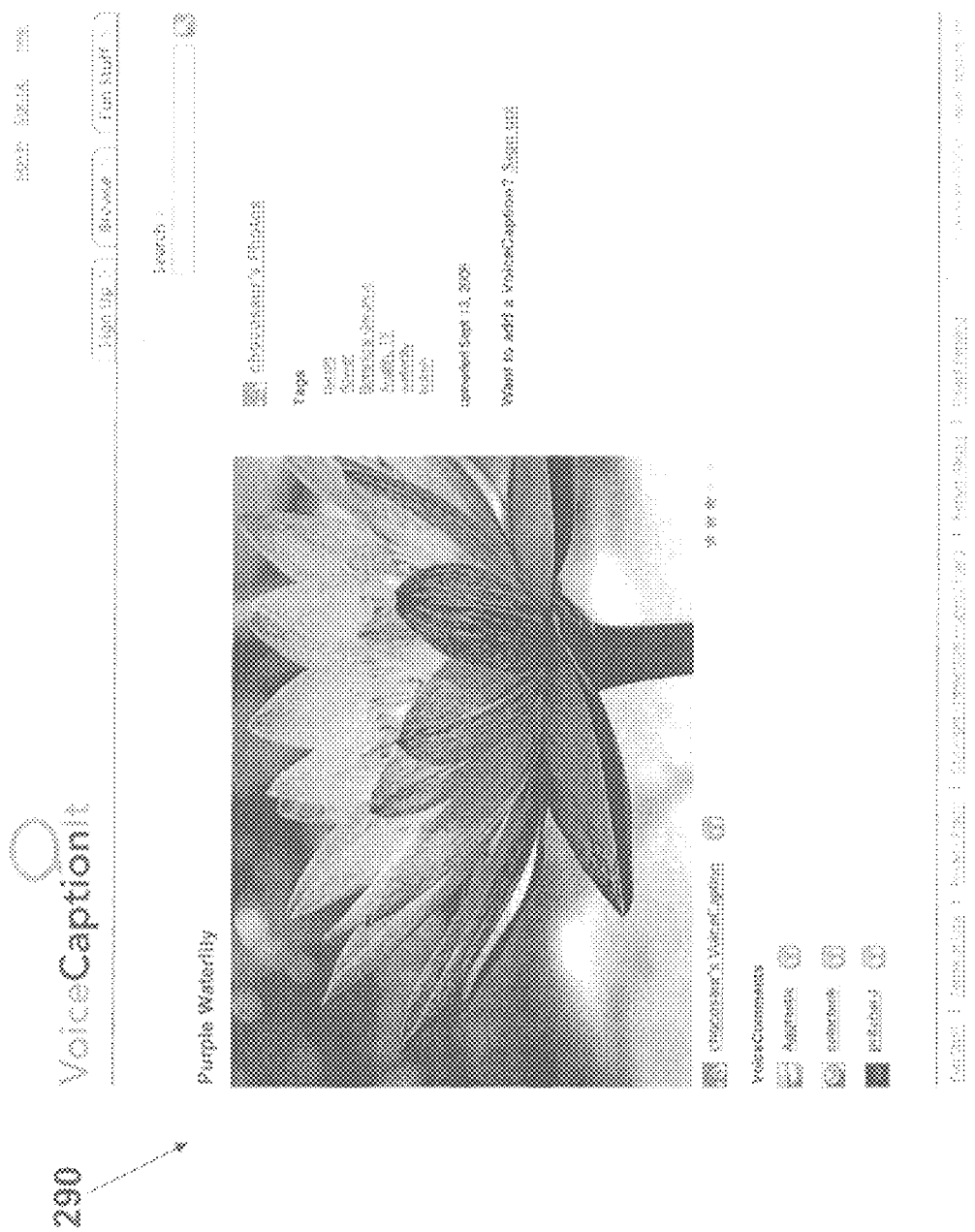
FIG. 19 illustrates an example of an image detail page of the system when a user is not logged into the system.

FIG. 19 illustrates an example of an image detail page 290 of the system when a user is not logged into the system. The purpose of this page is to allow a visitor to view the details of an image and listen to the VoiceCaptions and VoiceComments. It is identical to the functionality of Photo Detail described above. The only differences are:

"Signed in as . . . " is not displayed in the upper right

"Sign Out" is not displayed in the upper right

"Settings" is not displayed in the upper right

The visitor is not allowed to add a VoiceCaption (must be a member to add a VoiceCaption)

The "tabs" for "My Photos" and "Manager" do not appear

A new "tab" for "Sign Up" appears. This leads to the sign-up page described above.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A system comprising:
an object hosting unit that stores an object having a unique identifier and including a graphic that is associated with a particular user;
a voice-based system includes a telephone associated with the particular user, separate from the object hosting system but coupled to the object hosting unit wherein an audible message generated by the particular user is stored in the voice-based system for association with the object having the unique identifier;
wherein the object hosting unit further comprises a unit that associates the audible message with the object having the unique identifier so that the audible message can be accessed when the object is accessed; and
a computing device that accesses the object hosting unit over a link to access the object and the audible message.

2. The system of claim 1, wherein the object hosting unit further comprises a data store configured to store a plurality of objects and information associated with each object.

3. The system of claim 2, wherein the information associated with each object further comprises the audible message associated with the object, one or more voice comments associated with the object, one or more ratings of the object and one or more tags associated with the object.

4. The system of claim 3, wherein the data store further comprises one or more database servers and one or more file servers wherein the database servers store the objects and the messages associated with the objects.

5. The system of claim 1, wherein the voice-based system further comprises one of a voice over IP system and a voice-mail system.

6. The system of claim 1, wherein the object hosting unit further comprises a plurality of server computers.

7. The system of claim 6, wherein the voice-based unit further comprises one or more Asterisk servers that control the voice-based unit and wherein the object hosting unit further comprises one or more web servers.

8. The system of claim 1, wherein the objects each further comprise one of a digital picture and an image.

9. The system of claim 1, wherein the object hosting unit further comprises one or more web servers and wherein the system further comprises a one or more computing devices that establish a session with the one or more web servers and wherein each computing device further comprises a processing unit that executes a browser application that interacts with the web servers using a plurality of web pages to which the session is established and wherein each computing device further comprises one of a personal computer, a mobile telephone, a PDA, a Blackberry device, a wireless email device, a portable computing Windows CE- based device.

10. The system of claim 1, wherein the telephone is one of, a cellular phone, a mobile phone or a voice over IP based phone.

11. The system of claim 10, wherein the voice-based system is configured to call the telephone.

12. The system of claim 10, wherein the user calls the voice-based system using the telephone.

13. A computer implemented method comprising:
storing an object having a unique identifier that is associated with a particular user on an object hosting unit;
generating an audible message with an identifier for the particular user using a voice-based system that includes a telephone associated with the particular user having a microphone to record the audible message;
associating the audible message with the identifier for the particular user with the object having the unique identifier;
converting the audible message with the identifier for the particular user from the voice-based system into an audio clip format; and
associating the audio clip with the object having the unique identifier so that the audio clip can be accessed when the object is accessed.

14. The method of claim 13 further comprising storing, in a data store, a plurality of objects and information associated with each object.

15. The method of claim 14, wherein the information associated with each object further comprises the audible message associated with the object, one or more voice comments associated with the object, one or more ratings of the object and one or more tags associated with the object.

16. The method of claim 13, wherein the plurality of objects each further comprise one of a digital picture and an image.

17. The method of claim 13 further comprising establishing a session, by a browser application of a computing device, with a web server of the object hosting unit and interacting with the web server using a plurality of web pages.

18. The method of claim 13, wherein the telephone is one of: a mobile phone or a voice-over-IP phone.

19. The method of claim 13, wherein generating the audible message further comprises automatically calling the telephone to generate the audible message.

20. A system comprising:
an object hosting unit that stores an object having a unique identifier;
a voice-based system, separate from the object hosting unit, coupled to the object hosting unit wherein an audible message generated by a particular user is stored in the voice-based system for association with the object having the unique identifier, the voice-based system including a mobile telephone having a microphone to record the audible message;

wherein the object hosting unit associates the audible message recorded with the voice-based system with the object having the unique identifier so that the audible message can be accessed when the object is accessed; and a computing device that accesses the object hosting unit over a link and accesses the object and the audible message at the object hosting unit.

* * * * *